(12) United States Patent
Dworatzek et al.

(10) Patent No.: US 8,444,736 B2
(45) Date of Patent: May 21, 2013

(54) AIR FILTER UNIT HAVING A RADIALLY DIVIDED HOUSING

(75) Inventors: Klemens Dworatzek, Edingen (DE); Ralf Bauder, Ketsch (DE); Steffen Ackermann, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/466,765

(22) Filed: May 8, 2012

(65) Prior Publication Data

US 2012/0216497 A1     Aug. 30, 2012

Related U.S. Application Data (63) Continuation of application No. 12/375,231, filed as application No. PCT/EP2007/057381 on Jul. 17, 2007, now abandoned.

(30) Foreign Application Priority Data

Aug. 3, 2006 (DE) .................... 20 2006 011 991 U (51) Int. Cl.
*B01D 39/00* (2006.01)
*B01D 46/00* (2006.01)
*B01D 27/00* (2006.01)
*B01D 35/00* (2006.01)
*B01D 35/28* (2006.01)

(52) U.S. Cl.
USPC .................. 55/498; 55/502; 55/510; 210/440

(58) Field of Classification Search
USPC .............................. 55/498, 502, 510; 210/440
See application file for complete search history.

(56) References Cited

U.S. PATENT DOCUMENTS

| | | | | |
|---|---|---|---|---|
| 3,130,025 A | * | 4/1964 | Bowden et al. | 55/503 |
| 3,186,552 A | * | 6/1965 | Cutler | 210/457 |
| 3,238,986 A | * | 3/1966 | Butler, Sr. | 411/270 |
| 3,423,909 A | * | 1/1969 | Bennett et al. | 55/498 |
| 3,767,054 A | * | 10/1973 | Farrow et al. | 210/232 |
| 4,157,968 A | * | 6/1979 | Kronsbein | 210/489 |
| 4,278,453 A | * | 7/1981 | Klein | 96/117.5 |
| 4,369,113 A | * | 1/1983 | Stifelman | 210/440 |
| 4,559,138 A | * | 12/1985 | Harms, II | 210/316 |
| 4,652,367 A | | 3/1987 | Reulecke et al. | |
| 4,678,577 A | * | 7/1987 | Thomas et al. | 210/441 |
| 5,080,787 A | * | 1/1992 | Brown et al. | 210/232 |
| 5,116,499 A | * | 5/1992 | Deibel | 210/232 |
| 5,589,060 A | * | 12/1996 | Gebert et al. | 210/130 |
| 5,762,788 A | * | 6/1998 | Gullett | 210/232 |
| 5,922,196 A | * | 7/1999 | Baumann | 210/232 |

(Continued)

FOREIGN PATENT DOCUMENTS

WO    WO0126772 A2    4/2001
WO    WO2004039476 A1    5/2004

*Primary Examiner* — Amber Orlando
(74) *Attorney, Agent, or Firm* — James Hasselbeck (57) ABSTRACT

In a filter element (10) having a filter bellows (11) which is covered at each end by an end disk (13, 14), the end disks (13, 14) are each provided with at least one coupling element for coupling to a filter housing (20) and connected to one another via at least one central tube (12) spanning the filter bellows (11). Alternatively, a central tube which runs right through and onto which end disks and filter bellows are pushed and which is configured at its ends for coupling with parts of the housing is present.

9 Claims, 7 Drawing Sheets

U.S. PATENT DOCUMENTS

| | | | |
|---|---|---|---|
| 6,053,334 A * | 4/2000 | Popoff et al. | 210/438 |
| 6,096,207 A * | 8/2000 | Hoffman et al. | 210/232 |
| 6,139,607 A * | 10/2000 | Coulonvaux | 95/273 |
| 6,153,098 A * | 11/2000 | Bayerlein et al. | 210/497.1 |
| 6,165,355 A * | 12/2000 | Coulonvaux et al. | 210/131 |
| 6,171,355 B1 * | 1/2001 | Gieseke et al. | 55/330 |
| 6,383,244 B1 * | 5/2002 | Wake et al. | 55/482 |
| 6,409,786 B1 * | 6/2002 | Wright et al. | 55/507 |
| 6,416,561 B1 * | 7/2002 | Kallsen et al. | 55/482 |
| 6,481,580 B1 * | 11/2002 | Amstutz et al. | 210/440 |
| 6,485,635 B1 * | 11/2002 | Gandini et al. | 210/117 |
| 6,540,806 B2 * | 4/2003 | Reinhold | 55/490 |
| 6,554,139 B1 * | 4/2003 | Maxwell et al. | 210/435 |
| 7,122,120 B2 * | 10/2006 | Diel | 210/232 |
| 7,303,673 B1 * | 12/2007 | Glazewski | 210/232 |
| 7,311,748 B2 * | 12/2007 | Holmes et al. | 55/498 |
| 7,390,342 B2 * | 6/2008 | Pearson et al. | 55/486 |
| 7,964,010 B2 * | 6/2011 | Lane et al. | 55/498 |
| 2002/0100723 A1 * | 8/2002 | Courtney | 210/446 |
| 2002/0141910 A1 * | 10/2002 | Adiletta | 422/171 |
| 2003/0019809 A1 * | 1/2003 | Amstutz et al. | 210/440 |
| 2003/0213741 A1 * | 11/2003 | Wright et al. | 210/450 |
| 2004/0060439 A1 * | 4/2004 | Byrd | 95/273 |
| 2009/0255866 A1 * | 10/2009 | Pfitzer et al. | 210/232 |

* cited by examiner

AIR FILTER UNIT HAVING A RADIALLY DIVIDED HOUSING

CROSS-REFERENCE TO RELATED APPLICATIONS

This application is a Continuation of U.S. patent application Ser. No. 12/375,231 which is a U.S. National Stage Entry of International Application PCT/EP2007/057381 having an effective U.S. filing date of Jul. 17, 2007. Priority is claimed through U.S. Ser. No. 12/375,231 to German application number 202006011991.4 filed Aug. 3, 2006.

TECHNICAL FIELD

The invention concerns a filter element with a filter bellows that at its ends is covered by a terminal disk, respectively.

PRIOR ART

Air filter units are known that comprise a substantially cylindrical housing that can be opened at least at one end face by removing a lid or the like in order to be able to remove and exchange the cylindrically designed filter element. Screw connections are known for connecting housing element and lid element. For this purpose, the rim of the lid must however be freely accessible and its edge must be provided with a structure for increasing grip, for example, a knurling, so that the lid can be gripped by hand at both sides and can be unscrewed. Accordingly, additional space laterally of the filter unit must be provided for servicing.

Moreover, several thread turns must be provided in order to be able to effect a sufficiently fast screw connection so that unscrewing the lid requires a correspondingly great amount of time. When screwing on the lid additional care must be taken that the thread turns of lid and housing are inserted into one another properly.

Moreover, it is known to provide tie rod elements between the housing bottom and a lid. It can be embodied, for example, as a threaded bolt that extends through the lid and by means of wing nuts the lid is forced against the housing. This also has the disadvantage of requiring a long time for releasing and tightening the tie rod elements as well as the cost disadvantage for the additional tie rod element that, moreover, also forms a flow impairment in the interior flow passage of the air filter element.

It is thus an object of the invention to provide a filter element that can be installed and removed faster.

SUMMARY OF THE INVENTION

This object is solved according to a first embodiment by the filter element having the features of claim 1.

The gist of the invention is thus that the filter element inserted into a housing makes it possible that the housing parts relative to one another or the housing and a correlated lid communicate with one another by a filter element, i.e., by means of the filter element a positive-locking connection between the housing parts to be connected to one another is provided in which the filter element serves as a tie rod and effects a positive-locking coupling. Additional tie rod elements are therefore not required. It is moreover important that a connection of housing parts is not possible without the inserted filter element embodied in accordance with the invention because the housing parts would simply fall apart. It is therefore in particular not possible to operate the air filter unit wantonly or accidentally without inserted air filter element.

According to a first embodiment in accordance with claim 1, the force between the terminal disks and their coupling projections is transmitted directly through the filter bellows that accordingly must be connected fixedly to the terminal disks.

According to a second embodiment in accordance with claim 4, the filter bellows itself is not an element of force transmission. Filter bellows and terminal disks surround instead a central tube whose length is greater than the length of the filter bellows with attached terminal disks and whose length portions projecting past the terminal disks are embodied as coupling projections with at least one coupling element for coupling with a filter housing.

In the area of coverage by the filter bellows the central tube is perforated, slotted, or provided with other openings. The central tube can also be of a two-part configuration when the connection of the individual parts enables a transmission of tensile forces.

The terminal disks in this embodiment must not be of a solid configuration. Flexible film-like covers of the end faces of the filter bellows or a pore closure by potting compounds is possible also in this connection.

A preferred embodiment provides that the filter element has as a coupling element a threaded projection on one terminal disk with, in particular, a conical thread. As a result of the conical embodiment of the threaded projection and a matching threaded bore on the housing a self-centering action is provided when the air filter element is pushed onto the housing element. Accordingly, a rotation by a relatively small angle is sufficient in order to engage a plurality of thread turns with one another and, in this way, to effect a correspondingly high strength of the threaded connection relative to axial forces.

Advantageous in this connection is a buttress thread that is well suited as a thread with clearance and is dirt-insensitive and is also easily movable. For example, a conical buttress thread is suitable that has for a diameter of approximately 100 mm 4 to 5 thread turns that have a cone angle of 3 degrees to 12 degrees.

Preferably, the connection between the filter element and one of the housing parts is configured in the described way with a conical thread. In order to be able to grip the filter element laterally and to be able to turn it, a sufficiently large space is available that matches at least the outer diameter of the housing bottom part to be placed onto the housing top part.

In principle, it is also possible to connect the filter element with two housing parts by means of a conical thread to the filter insert element. In the case of two threads, however, an unpredictable angular position of the housing parts screwed together can result. It is therefore preferred that at least one coupling element on the filter element is designed such that different angular positions of the housing parts to be coupled are possible. This is achieved, for example, by means of a bayonet connection with locking receptacles positioned at same angular spacings relative to one another.

It is also possible to provide a snap connection, in particular, an annular snap connection, that is especially advantageous when filter element and housing bottom part or lid are to be replaced as a non-releasable unit for servicing. The filter element is then suitable to be locked with a housing part in a detachable or non-detachable way.

A preferred embodiment provides on at least one connecting location at least one radially movable locking element that can be inserted into a groove, an undercut, or any other engagement cutout on a projection of the terminal disk of the air filter element so that the filter element is locked by positive-locking action with a housing part.

Inasmuch as the engagement cutout on the air filter element is a continuous groove, any positioning of the filter element relative to the housing part is possible. A reverse arrangement is possible also in which at least one coupling element on the filter element is a locking element that can engage compatible cutouts in the housing.

In the embodiments with the movable locking elements a securing action of the housing without the inserted filter element is not possible and thus operation of the filter unit without air filter element is not possible either.

BRIEF DESCRIPTION OF THE DRAWINGS

The invention will be explained in more detail in the following with reference to the drawing. The Figures show in detail in.

EMBODIMENT(S) OF THE INVENTION

Figure 1:
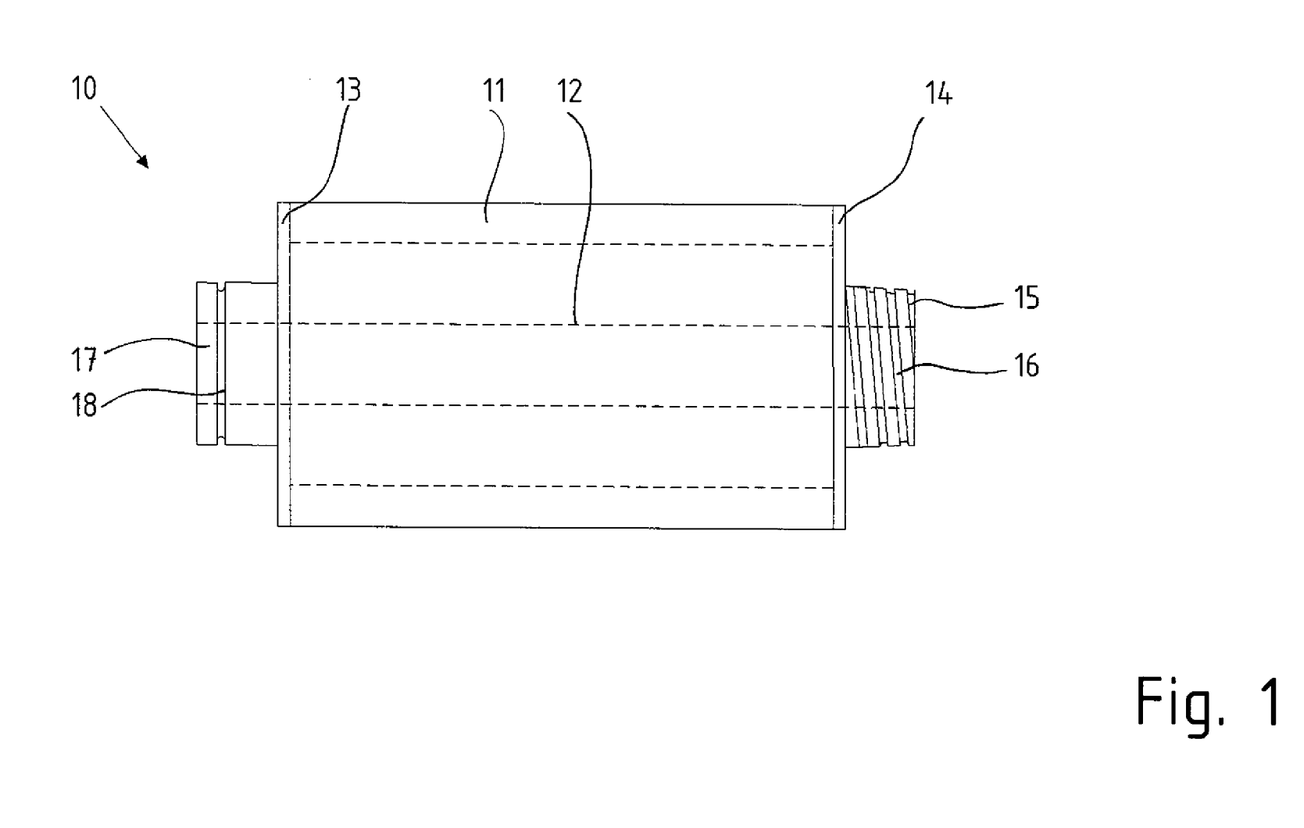
FIG. 1—a filter element in a schematic side view.

FIG. 1 shows a filter element 10 comprising a filter bellows 11 that, for example, is formed of a pleated filter paper that is coiled to a tubular cylindrical body. The filter bellows 11 is connected at both ends to terminal disks 13, 14 and forms together with them a cylindrical hollow body.

The terminal disk 14 has a projection 15 with a thread 16 as a coupling element. The projection 15 is conical and has a cone angle of 3 degrees to 12 degrees relative to the center axis. On the terminal disk 13 of the filter element 10, a projection 17 is formed integrally that, in the illustrated embodiment, is provided with a groove 18 as an engaging cutout.

Figure 2:
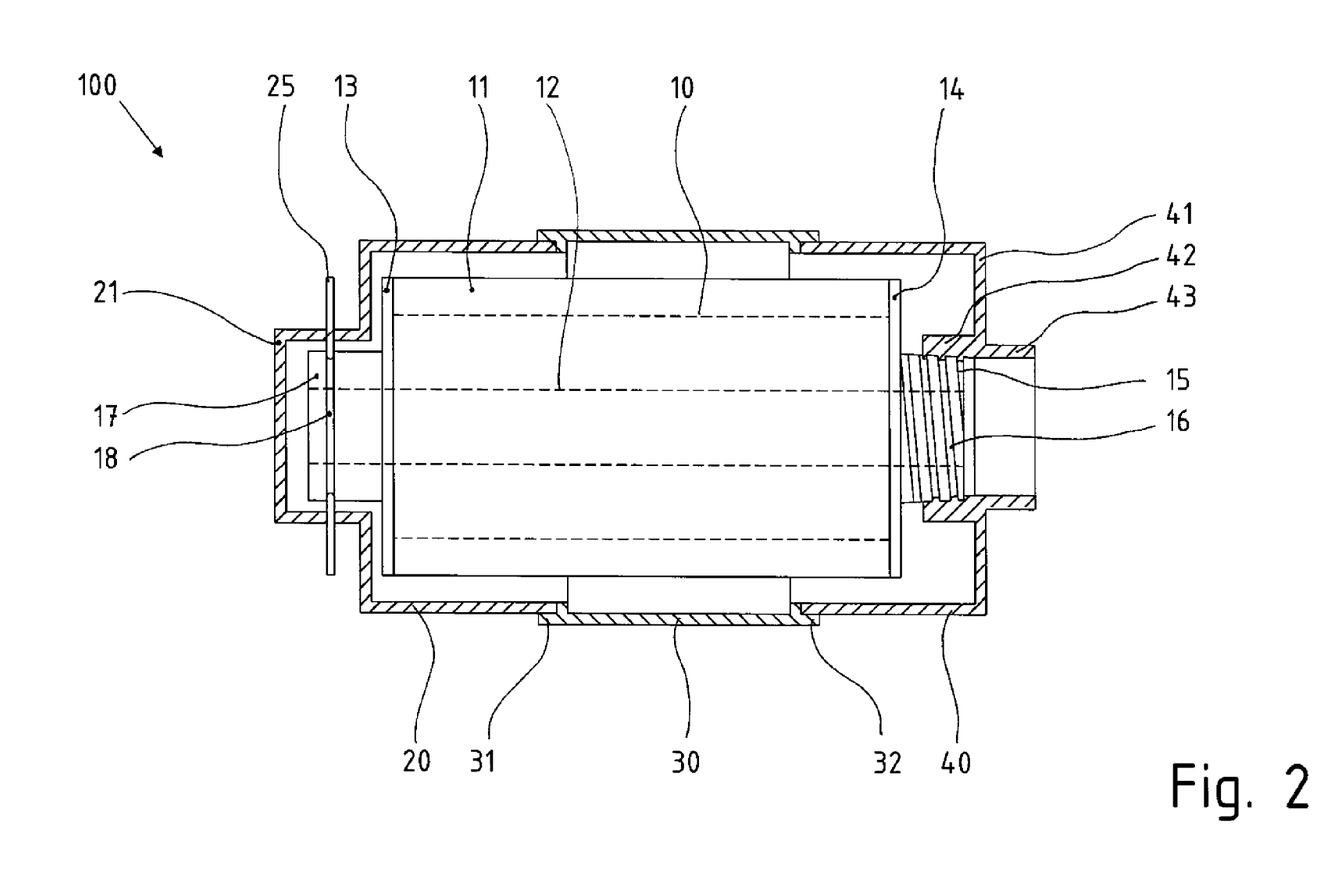
FIG. 2—a section of the filter element inserted into an air filter housing in accordance with a first embodiment.

In FIG. 2 the filter element 10 is shown within an air filter unit 100 in a further schematic section illustration. A housing is comprised of three housing parts 20, 30, 40.

Oppositely arranged there is a projection 42 of a bottom section 41 of a housing part 40; it is provided with a conical inner thread that is engaged by the outer thread 16 of the projection 15. By means of the thread as a coupling element the filter element 10 and housing part 40 can be fixedly connected to one another.

A central housing part 30 is pushed onto the housing part 40 at a connecting location 32 without being connected fixedly to the housing part 40. In the same way, a housing part 20 is connected at connecting location 31 to the housing part 30.

All housing parts 20, 30, 40 are only loosely inserted into one another and enclose the filter element 10 in the jointly formed housing.

On the housing part 20 locking elements 25 are provided that in the radial direction can be inserted through cutouts in the housing part 20 until they engage the groove 18 or any other engagement cutout. By the engagement of the locking elements 25 in the projection 17 an axial securing of the housing part 20 relative to the filter element 10 is realized. Since the latter is at the same time connected by means of the thread connection 16, 42 with the oppositely arranged housing part 40, the housing parts 20, 40 together with the interposed housing part 30 are secured relative to one another. Upon pressure loading of the interior of the housing in operation, the filter element is loaded by tension and keeps the housing parts 20, 30, 40 together which are not coupled with one another by other means in the axial direction.

In order to keep mechanical loading of the filter bellows 11 in the filter element 10 minimal, the filter element 10 preferably has a central tube 12 that has an interior forming a flow passage and that at the same time bridges the distance between the terminal disks 13, 14 in order to thus transmit forces between the projections 17, 15.

Figure 3:
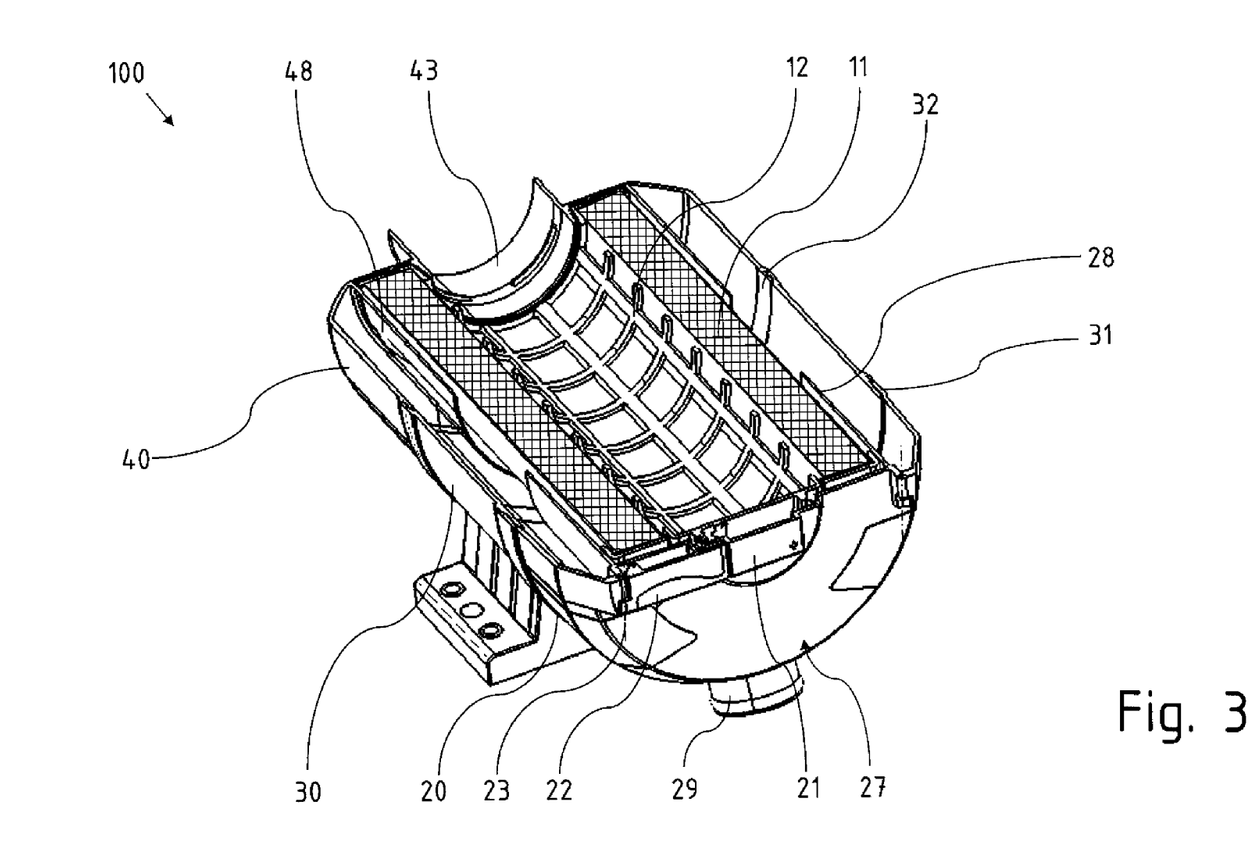
FIG. 3—a section of the air filter housing with filter element in a perspective view.

The filter unit illustrated schematically in FIG. 2 is shown in FIG. 3 also in section in the form of a concrete embodiment. Clearly visible is the central tube 12 provided on the inwardly positioned filter element 10 that is also shown in section; the central tube has no closed outer wall but has a grid structure in order to impair as little as possible the radial air flow through the filter bellows 11.

In the area of the housing part 20 the filter element 10 is surrounded by an additional collar 28 so that between the outer side of the collar 28 and the housing wall of the housing part 20 an annular gap results. The same holds true also for the oppositely positioned side where the collar 48 surrounds the filter element. When the unfiltered air flows in tangentially through the intake socket 44 (compare FIG. 4), the air mass that is introduced into the housing flows along the inner circumference of the housing wall so that heavy dust particles are separated and can flow out at the separator socket 29, and the air mass flows radially from the exterior to the interior through the filter bellows 11.

The locking elements on the housing part 20 are combined with folding flaps 22 that are connected on an axis 23 to the end face 27 of the housing part 20. The function of the folding flaps 22 as well as generally the function of the air filter unit 100 according to the invention will be explained in the following with reference to the following FIGS. 4 to 6.

Figure 4:
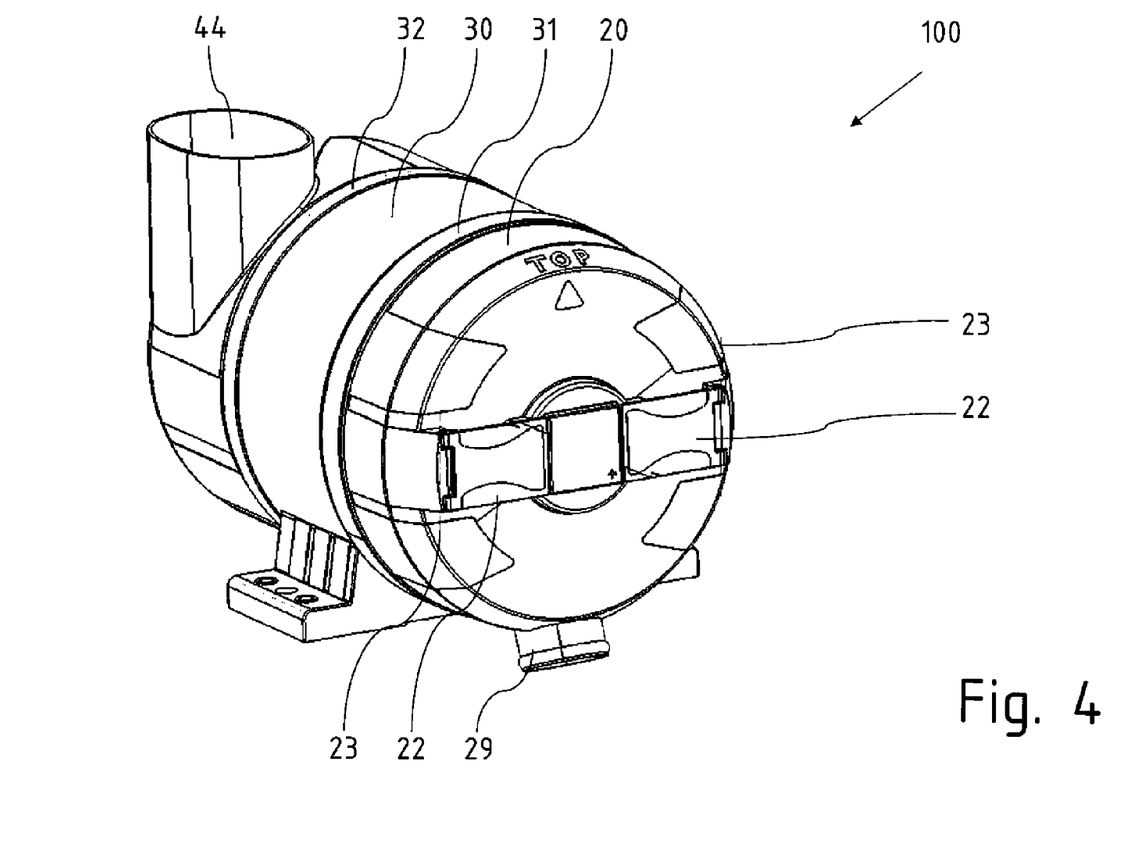
FIGS. 4, 5—a perspective view of the closed air filter housing, respectively.

FIG. 4 shows the air filter unit with its housing parts 20, 30, 40 and the filter element 10 inserted therein. The illustrated configuration indicates to the operator that an air filter element is properly inserted because, when the air filter element 10 in accordance with the present invention is missing, the housing parts 20, 30, 40 in the illustrated position of FIG. 4 would not be axially connected to one another and could not stay secured on one another.

The folding flaps 22 are positioned in FIG. 4 so as to rest flat on a central projection 21 at the end face 27 of the housing part 20. They are secured, respectively, on an axis 23 arranged at the outer circumference.

Figure 5:
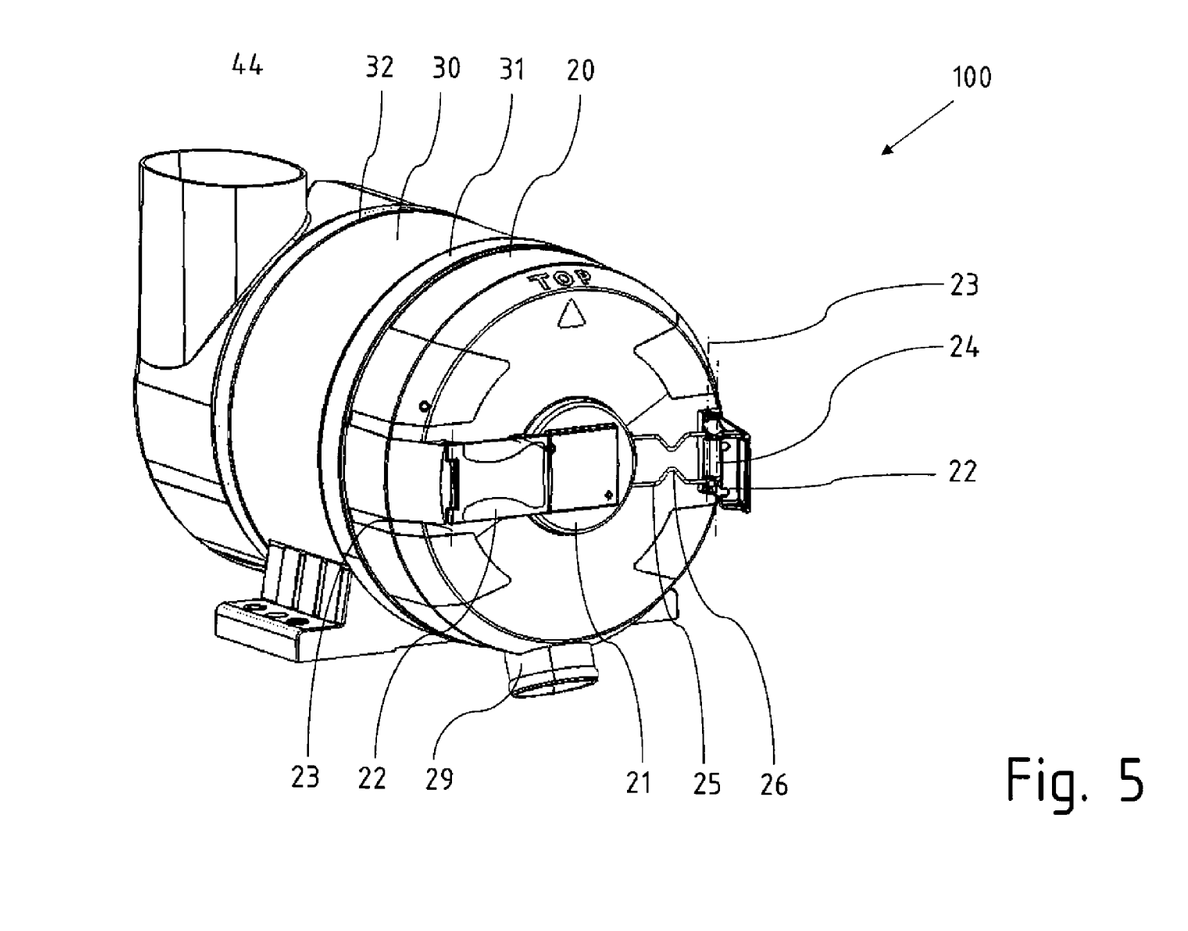

In FIG. 5, the right folding flap 22 is illustrated in the open position. It is pivoted about axis 23 relative to the housing part 20. By doing so, a clamping bracket 25 as a locking element is entrained which is connected on a second axis 24 to the folding flap 22.

The clamping bracket 25 extends through slot-shaped lateral cutouts (not illustrated here) on the projection 21 of the housing part 20. The clamping bracket 25 is made from wire and is designed in a springy fashion by means of the constricted areas 26 illustrated in FIG. 5. When the folding flap upon closing of the air filter unit 100 is again pressed against the housing part 20, the clamping bracket 25 with its leading-edge is moved into the corresponding profiled part 17 on the projection 18 (compare FIG. 1) of the air filter element inserted into the interior of the air filter unit.

In that two spaced apart axes 23, 24 are provided, a dead center position must be overcome by the operator when positioning the folding flaps 22 against the end face 27 so that a self-locking action of the produced locking action is prevented by the folding flaps 22 and, moreover, the operator is made aware that the connection between housing and air filter element has been generated properly.

After both folding flaps 22 have been moved into the open position and accordingly the clamping brackets 25 have been pulled out of the cutouts 18 on the projection 17 of the air filter element, the housing part 20 can be removed. It is advantageous in this connection that the operator must only carry out manipulations from the end face 27 of the housing part 20, i.e., only within the mounting space that is required anyway for axially pulling out and inserting the air filter element 10. In this way, the space lateral of the air filter housing 10 can be utilized completely close up to the housing wall.

Figure 6:
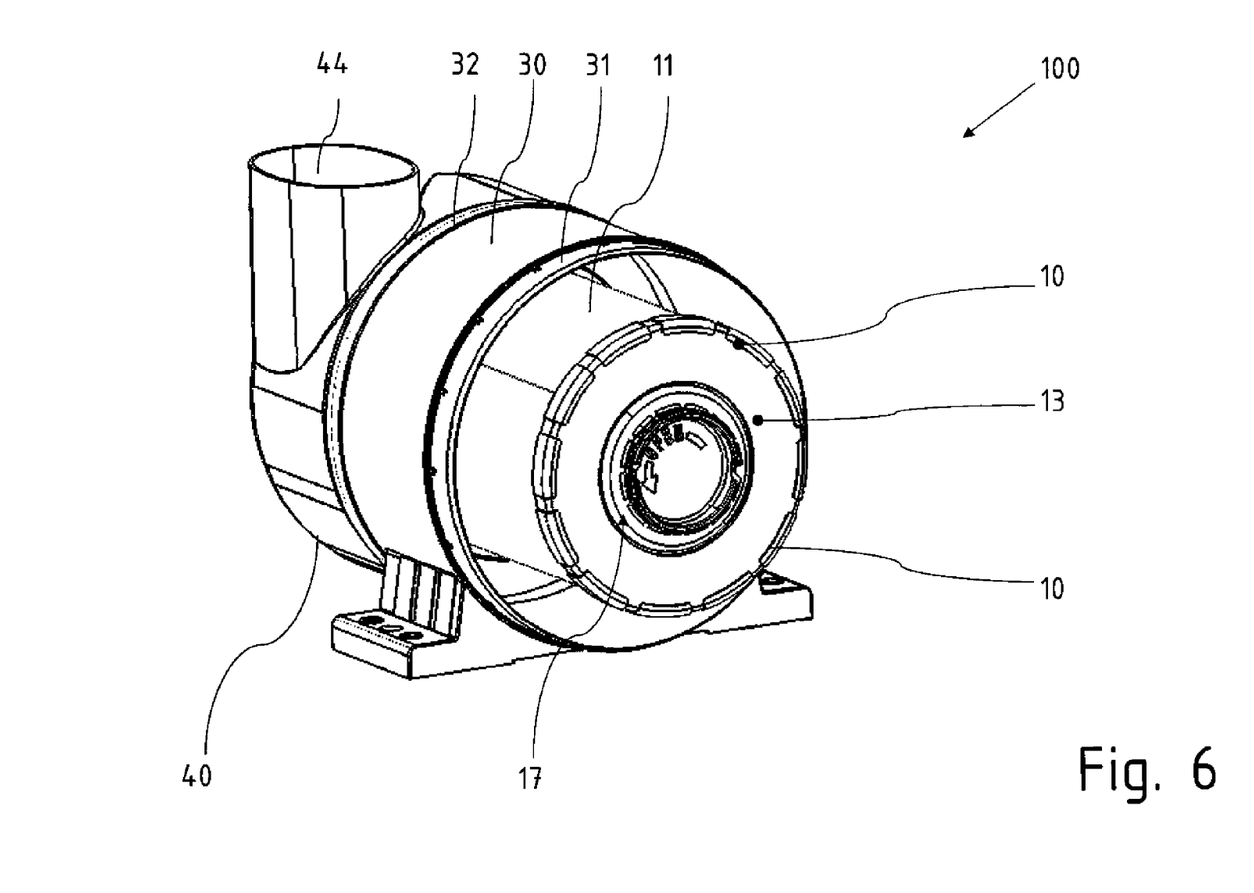
FIG. 6—the air filter housing in a perspective view with removed housing part.

In FIG. 6 the housing is shown open as the housing part 20 has been removed. The filter element 10 with its terminal disk 13 and the projection 17 are exposed. Profiled parts on the outer edge of the terminal disk 13 and/or on the projection 17 facilitate gripping and turning of the air filter element 10 by the operator in order to release again the thread connection between the air filter element 10 and the housing bottom 41 of the housing part 40.

Since the air filter element 10 is screwed in, the rear mounting space outwardly positioned at the bottom 41 must not be accessible. All required manipulations in connection with changing the air filter element 10 can thus be carried out from the location of the end face 27 of the housing part 20.

Figure 7:
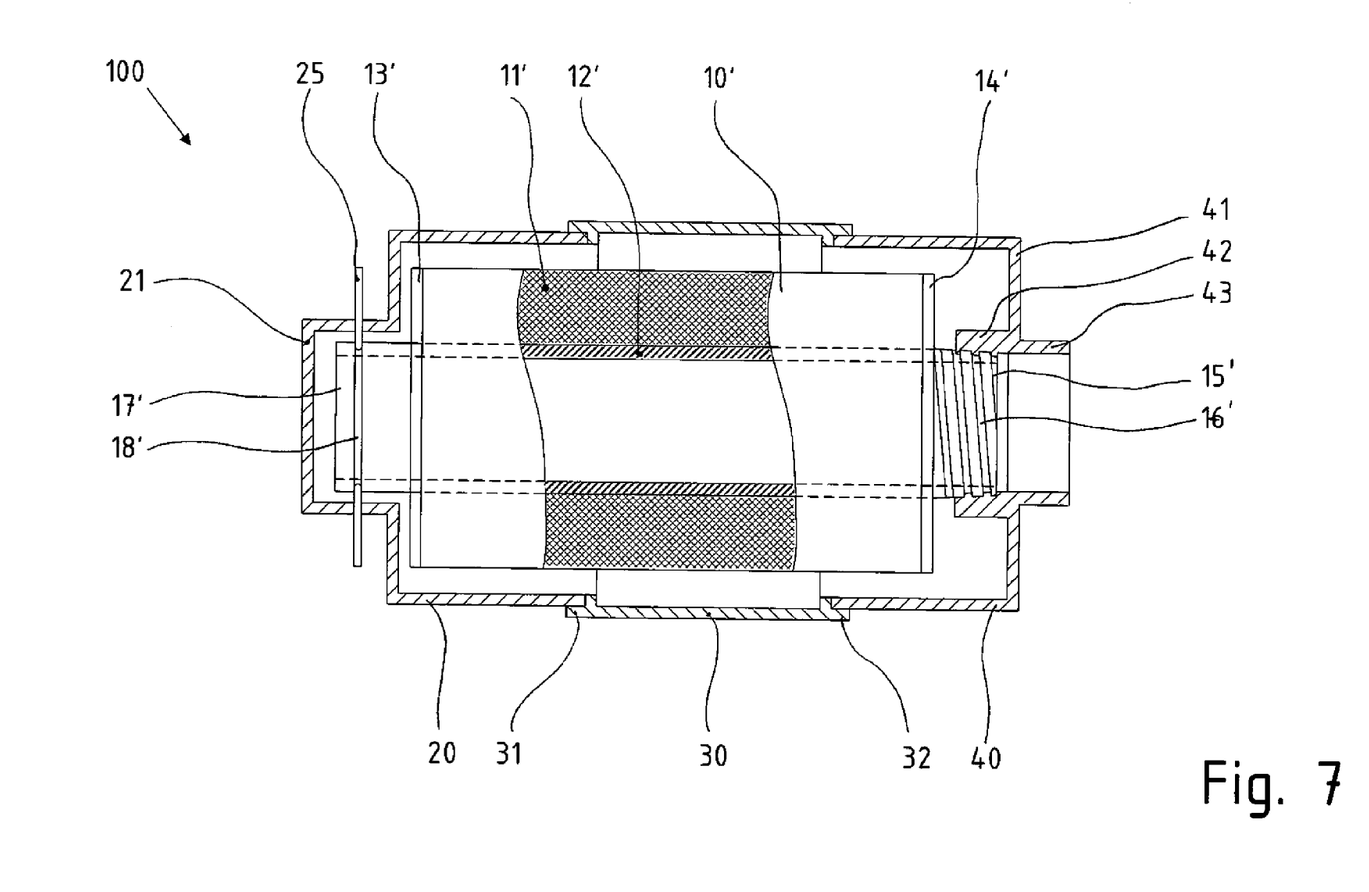
FIG. 7—a section of the filter element inserted into an air filter housing in accordance with a second embodiment.

FIG. 7 shows in analogy to FIG. 2 in section illustration a second embodiment of a filter element 10' in the already described filter housing 20. The difference is that a continuous central tube 12' is provided on which at the ends a coupling projection 15', 17' with coupling elements is provided, respectively. The coupling elements in the illustrated embodiment are a conical thread 16' on one side and a groove 17' for engagement of the housing locking device 25 on the opposite side. In this way, by means of the rigid central tube 12' a clamping action of the housing parts 20, 30, and '40 is realized. A cylindrical filter bellows 11' is covered at the ends with terminal disks 13', 14' and connected to them in such a way that no unfiltered air can flow past the filter bellows 11'. In the area of coverage by the filter bellows 11' the central tube 12' is provided with cutouts, for example, in a grid shape, so that air from the interior of the central tube can flow into the filter bellows and vice versa. By means of projections, pins etc. on the central tube 12' the package of terminal disks 13', 14' and filter bellows 11' can be compressed axially.

The invention claimed is:

1. An exchangeable filter element comprising: a filter bellows of filter media, said filter bellows having two axially opposing ends; a first terminal disk connected to said filter bellows at one of said axial ends, said first terminal disk attached to a first coupling projection extending axially outwardly away from said first terminal disk; a second terminal disk connected to said filter bellows at another of said axial ends, said second terminal disk attached to a second coupling projection extending axially outwardly away from said second terminal disk; a stabilizing element spanning said filter bellows, extending axially in a central recess of said filter bellows from said first terminal disk to said second terminal disk, said stabilizing element coupling and transmitting tensile forces between said first coupling projection and said second coupling projection; wherein said first coupling projection includes a radially open endless groove formed into a radially outer surface of said first coupling projection and extending circumferentially around said first coupling projection; wherein said endless groove is continuous and does not form a thread; wherein said endless groove is operable for engagement by at least one radially moving locking element, wherein said locking element is moved radially inwardly to engage into said endless groove: wherein said stabilizing element includes said first coupling projection and said second coupling projection; wherein said first coupling projection is provided on a first end of said stabilizing element; wherein said second coupling projection is provided on an opposing second end of said stabilizing element; wherein said stabilizing element including said first and second coupling projections is a continuous central tube.

2. The exchangeable filter element according to claim 1, wherein
the stabilizing element is a central tube having an interior flow passage, said central tube extending through a central recess in said filter bellows.

3. The exchangeable filter element according to claim 1, wherein
said second coupling projection is a threaded projection having formed thereon a conical thread.

4. The exchangeable filter element according to claim 3, wherein
said stabilizing element is a central tube having an interior flow passage, said central tube extending through a central recess in said filter bellows.

5. The exchangeable filter element according to claim 3, wherein
said conical thread is a buttress thread.

6. The exchangeable filter element according to claim 3, wherein
an outer wall of said threaded projection has a cone angle of between 3 to 12 degrees.

7. An air filter unit comprising: an exchangeable filter element including a filter bellows of filter media, said filter bellows having two axially opposing ends; a first terminal disk connected to said filter bellows at one of said axial ends, said first terminal disk attached to a first coupling projection extending axially outwardly away from said first terminal disk; a second terminal disk connected to said filter bellows at another of said axial ends, said second terminal disk attached to a second coupling projection extending axially outwardly away from said second terminal disk; a stabilizing element spanning said filter bellows, extending axially in a
central recess of said filter bellows from said first terminal disk to said second terminal disk, said stabilizing element coupling and transmitting tensile forces between said first coupling projection and said second coupling projection; wherein said first coupling projection includes a radially open endless groove formed into a radially outer surface of said first coupling projection and extending circumferentially around said first coupling projection; wherein said endless groove is continuous and does not form a thread; wherein said endless groove is operable for engagement by at least one radially moving locking element, wherein said locking element is moved radially
inwardly to engage into said endless groove; wherein said second coupling projection is a threaded projection having formed thereon a conical thread; wherein said stabilizing element is a central tube having an interior flow passage, said central tube extending through a central recess in said filter bellows; a radially divided filter housing including at least two housing parts detachably connected to one another in an axial direction and axially held together by tension forces transferred through said coupling projections of said filter element to form said housing enclosing said filter element; a first one of said at least two housing parts having a first housing end face; a second one of said least two housing parts having an opposing second housing end face; wherein said stabilizing element releaseably couples and extends between said first housing end face and said second housing end face, wherein said second housing part includes a threaded portion into which said second coupling projection is threadably engaged; wherein said first end face has an aperture into which said first coupling projection is received, at least one locking element arranged on said first end face of said housing, said at least one locking element moveable in said axial direction to engage into said endless groove of said first coupling projection, wherein said threaded engagement of said second coupling projection to said second housing part and said axially locking engagement of said first coupling projection with side first housing part secures said housing parts to said filter element and secures said housing parts together enclosing said filter element by transferring tension forces through said filter element, wherein upon pressure loading of an interior of said filter housing, said housing parts are held together by said transferred tension forces wherein said housing parts are not coupled with one another by other means in said axial direction.

8. The air filter unit of claim 7, comprising
at least one folding flap pivotally secured onto said second end face, said at least one folding flap operable to axially move and engage or disengage said at least one locking element with the first coupling projection.

9. A method of installing an exchangeable filter element in an air filter unit, comprising providing a exchangeable filter element comprising: a filter bellows of filter media, said filter bellows having two axially opposing ends; a first terminal disk connected to said filter bellows at one of said axial ends, said first terminal disk attached to a first coupling projection extending axially outwardly away from said first terminal disk; a second terminal disk connected to said filter bellows at another of said axial ends, said second terminal disk attached to a second coupling projection extending axially outwardly away from said second terminal disk; a stabilizing element spanning said filter bellows, extending axially in a central recess of said filter bellows from said first terminal disk to said second terminal disk, said stabilizing element coupling and transmitting tensile forces between said first coupling projection and said second coupling projection; wherein said first coupling projection includes a radially open endless groove formed into a radially outer surface of said first coupling projection and extending circumferentially around said first coupling projection; wherein said endless groove is continuous and does not form a
thread; wherein said endless groove is operable for engagement by at least one radially moving locking element, wherein said locking element is moved radially inwardly to engage into said endless groove; wherein said second coupling projection is a threaded projection having formed thereon a conical thread; wherein said stabilizing element is a central tube having an interior flow passage, said central tube extending through a central recess in said filter bellows; providing a radially divided filter housing comprising: at least two housing parts detachably connectable to one another in an axial direction and axially held together by tension forces transferred through said coupling projections of said filter element to form said housing enclosing said filter element; a first one of said at least two housing parts having a first housing end face; a second one of said least two housing parts having an opposing second housing end face; wherein said stabilizing element releaseably couples and extends between said first housing end face and said second housing end face, wherein said second housing part includes a threaded portion into which said second coupling projection is threadably engaged; wherein said first end face has an aperture into which said first coupling projection is received, at least one locking element arranged on said first end face of said housing, said at least one locking element moveable in said axial direction to engage into said endless groove of said first coupling projection,
wherein said threaded engagement of said second coupling projection to said second housing part and said axially locking engagement of said first coupling projection with side first housing part secures said first and second housing parts to said filter element and secures said housing parts together enclosing said filter element by transferring tension forces through said filter element, wherein upon pressure loading of an interior of said filter housing, said first and second housing parts are held together by said transferred tension forces, wherein said first and second housing parts are not coupled with one another by other means in said axial direction, axially inserting said filter element into an interior of said second housing part such that said second coupling projection positions against said threaded portion of said second housing part; gripping and turning said filter element at said first terminal end disk in a direction to threadably engage said second coupling projection into said second housing part; positioning and axially contacting said first housing part against said second housing part such that said filter element is enclosed in said filter housing and said first coupling projection is inserted into said aperture of said first housing part; moving said least one folding flap to a closed position engaging said at least one locking element into said first coupling projection.

* * * * *